United States Patent
Wu et al.

(10) Patent No.: US 7,443,481 B2
(45) Date of Patent: Oct. 28, 2008

(54) METHOD FOR MANUFACTURING A LCD PANEL COMPRISING APPLYING AN ELECTRICALLY CONDUCTIVE ADHESIVE TO AN OPENING DEFINED BY A PLATE SEALING ADHESIVE AND INTRODUCING LIQUID CRYSTAL MATERIAL BY A ONE DROP FILL METHOD

(75) Inventors: Jia-Yi Wu, Miao-Li (TW); Yun-Szu Liu, Miao-Li (TW); Kun-Hsing Hsiao, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 395 days.

(21) Appl. No.: 11/157,664

(22) Filed: Jun. 20, 2005

(65) Prior Publication Data

US 2005/0280765 A1    Dec. 22, 2005

(30) Foreign Application Priority Data

Jun. 18, 2004    (TW) ................ 93117704 A

(51) Int. Cl.
*G02F 1/1339* (2006.01)

(52) U.S. Cl. ............... 349/190; 349/189; 349/153; 349/154

(58) Field of Classification Search ........ 349/153, 349/154, 189, 190
See application file for complete search history.

(56) References Cited

U.S. PATENT DOCUMENTS

| | | | | |
|---|---|---|---|---|
| 5,169,693 | A * | 12/1992 | Fujimura | 349/154 |
| 5,929,959 | A * | 7/1999 | Iida et al. | 349/154 |
| 6,011,609 | A | 1/2000 | Kato et al. | |
| 6,573,957 | B1 * | 6/2003 | Suzuki | 349/73 |
| 6,636,192 | B1 * | 10/2003 | Saitoh | 345/87 |
| 6,791,660 | B1 * | 9/2004 | Hayashi et al. | 349/190 |
| 6,879,639 | B1 | 4/2005 | Verbin et al. | |
| 6,912,025 | B2 * | 6/2005 | Lin et al. | 349/110 |
| 6,989,879 | B1 * | 1/2006 | Nakahara et al. | 349/123 |
| 7,202,931 | B2 * | 4/2007 | Chung et al. | 349/153 |
| 7,253,866 | B2 * | 8/2007 | Moon et al. | 349/153 |
| 2001/0015786 | A1 * | 8/2001 | Katsura | 349/153 |
| 2001/0033357 | A1 * | 10/2001 | Niwa et al. | 349/154 |
| 2002/0131008 | A1 * | 9/2002 | Iwase et al. | 349/153 |
| 2002/0176046 | A1 * | 11/2002 | Kitamura et al. | 349/153 |
| 2003/0071955 | A1 * | 4/2003 | Nakayoshi et al. | 349/154 |
| 2005/0094088 | A1 * | 5/2005 | Kao et al. | 349/190 |

* cited by examiner

*Primary Examiner*—Andrew Schechter
*Assistant Examiner*—Charles Chang
(74) *Attorney, Agent, or Firm*—Wei Te Chung

(57) ABSTRACT

A liquid crystal display panel (1) includes an upper substrate (300) and a lower substrate (100) opposite to each other, a liquid crystal layer (200) interposed between the upper and lower substrates. A plate sealing adhesive (400) is applied to an interface between the upper plate and the lower plate, and encircling the liquid crystal layer. The plate sealing adhesive defines an opening (403) therein; and an electrically conductive adhesive (500) is applied in the opening. A method for manufacturing the liquid crystal display panel is also disclosed. The plate sealing adhesive can be evenly distributed.

4 Claims, 5 Drawing Sheets

US 7,443,481 B2

METHOD FOR MANUFACTURING A LCD PANEL COMPRISING APPLYING AN ELECTRICALLY CONDUCTIVE ADHESIVE TO AN OPENING DEFINED BY A PLATE SEALING ADHESIVE AND INTRODUCING LIQUID CRYSTAL MATERIAL BY A ONE DROP FILL METHOD

FIELD OF THE INVENTION

The present invention relates to liquid crystal display (LCD) panels and methods for manufacturing liquid crystal display panels.

BACKGROUND

LCD panels have been widely used in electronic products, following the rapid development of optoelectronics technology and semiconductor technology. The advantages of the LCDs include high image quality, compact size, light weight, low driving voltage, and low power consumption. Thus LCDs have been applied in the manufacturing of products such as portable computers, personal digital assistants and color televisions, and are gradually replacing the cathode ray tubes (CRTs) used in conventional display devices. In short, LCDs are rapidly becoming a mainstream display apparatus.

A typical liquid crystal display includes an upper plate, a lower plate, and a liquid crystal layer sealed between the upper and lower plates. The liquid crystal layer is generally introduced between the upper and lower plates by a vacuum inhalation method, which is operated based on a capillary action principle and a pressure difference principle. The vacuum inhalation method includes the following steps: placing a sealed double-plate panel having an opening into a vacuum chamber, and evacuating the sealed panel via the opening; immersing the evacuated panel into a liquid crystal bath; and filling liquid crystal material into the sealed panel by means of the vacuum. However, performing the vacuum inhalation method is time-consuming. This is particularly the case for larger sized panels. If vacuum inhalation is performed too slowly, the yield rate is reduced and the production efficiency is unsatisfactory.

To overcome the abovementioned shortcoming, a one drop fill (ODF) method has been developed. First, a liquid crystal is dropped on a lower plate. The lower plate is then adhered to an upper plate. Compared with the conventional vacuum inhalation method, the ODF method requires a shorter working time, and the yield rate for manufacturing a LCD panel is relatively increased.

FIGS. 4 to 7 show various aspects of plate sealing with an adhesive when the ODF method is employed. FIG. 4 shows a lower plate provided with a plate sealing adhesive. FIG. 5 is an enlarged view of part of the plate sealing adhesive. FIG. 6 is a side viewed showing the same part of the plate sealing adhesive. A lower plate 10 is first provided. A plate sealing adhesive 30 is then applied to the lower plate 10. The plate sealing adhesive 30 runs from a first end 31 along edge portions of the lower plate 10 to a second opposite end 32. The two opposite ends 31, 32 of the plate sealing adhesive 30 are overlapped.

Referring to FIG. 7, after the lower plate 10 is filled with the liquid crystal material by way of the ODF method, an upper plate 20 is attached to the lower plate 10. The upper plate 20 is then pressed toward the lower plate 10 such that the upper plate 20 is adhered to the lower plate 10 to form a sealed panel having an opening. As a result, a joint portion 33 of the plate sealing adhesive 30 spreads toward an edge of the lower plate 10 and the upper plate 20, and toward an interior of the sealed panel. When this happens, elements contained within the sealed panel may be contaminated, and the display provided by the LCD panel may be impaired. If the plate sealing adhesive 30 spreads beyond the edges of the upper and lower plates 20, 10, the aesthetic appearance of the display device may be degraded.

In addition, the plate sealing adhesive 30 generally comprises a plurality of glass fibers. The glass fibers reinforce the cured plate sealing adhesive 30, so that the lower and upper plates 10, 20 are supported in a spaced apart configuration. However, when the lower and upper plates 10, 20 are pressed and adhered to each other, the glass fibers may cause the joint portion 33 spread unevenly. Therefore, the glass fibers may also contribute to impairment of the display of the LCD panel.

To avoid the spreading of the plate sealing adhesive, some alternative means have been developed. Referring to FIGS. 8 and 9, a plate sealing adhesive is arranged in a loop configuration on a lower plate. At a joint portion 43 of the plate sealing adhesive, portions of first and second ends 41, 42 of the plate sealing adhesive are overlapped, with a distal end of the second end 42 extending toward an edge of the lower plate.

FIG. 10 illustrates another configuration of a plate sealing adhesive. At a joint portion 53, a first end 51 and a second end 52 cross each other, and both ends 51, 52 extend obliquely toward an edge of a lower plate.

In the two above-described means, certain ends of the plate sealing adhesive extend toward the edge of the lower plate. Therefore spreading of the plate sealing adhesive into the inside of the LCD panel can be avoided. However, the two above-described means cannot completely avoid the spreading of the plate sealing adhesive. In addition, due to the existence of the overlapped portions 43, 53 of the plate sealing adhesive, it is difficult for the upper plate to be accurately disposed parallel with the lower plate when the upper plate is been attached to the lower plate. Furthermore, the extending and spreading portions of the plate sealing adhesive represent a waste of the plate sealing adhesive material.

What is needed, therefore, is a liquid crystal display panel which has an evenly distributed plate sealing adhesive and which is economically configured.

SUMMARY

In a preferred embodiment, a liquid crystal display panel includes an upper plate, a lower plate, and a liquid crystal layer interposed between the upper plate and the lower plate. A plate sealing adhesive is applied to an interface between the upper plate and the lower plate, and encircling the liquid crystal layer. The plate sealing adhesive defines an opening therein; and an electrically conductive adhesive is applied in the opening.

In another embodiment, a method for manufacturing a liquid crystal display panel includes: providing an upper plate and a lower plate; applying a plate sealing adhesive on the lower plate, the applied plate sealing adhesive defining an opening; applying an electrically conductive adhesive on the lower plate, with at least a portion of the electrically conductive adhesive being applied to the opening so as to fill the opening; attaching the upper plate to the lower plate; and curing the plate sealing adhesive.

In the above-described liquid crystal display panel and method, the electrically conductive adhesive has at least a portion being applied to the opening so as to fill the opening, attaching the upper plate to the lower plate, and curing the plate sealing adhesive. That is, the above-described liquid crystal display panel and method can avoid the overlapping fault of the typical method. Therefore, the above-described liquid crystal display panel can all have evenly distribution of the plate sealing adhesive.

Other advantages and novel features will become more apparent from the following detailed description when taken in conjunction with the accompanying drawings, in which:

DETAILED DESCRIPTION OF PREFERRED EMBODIMENTS

Figure 1:
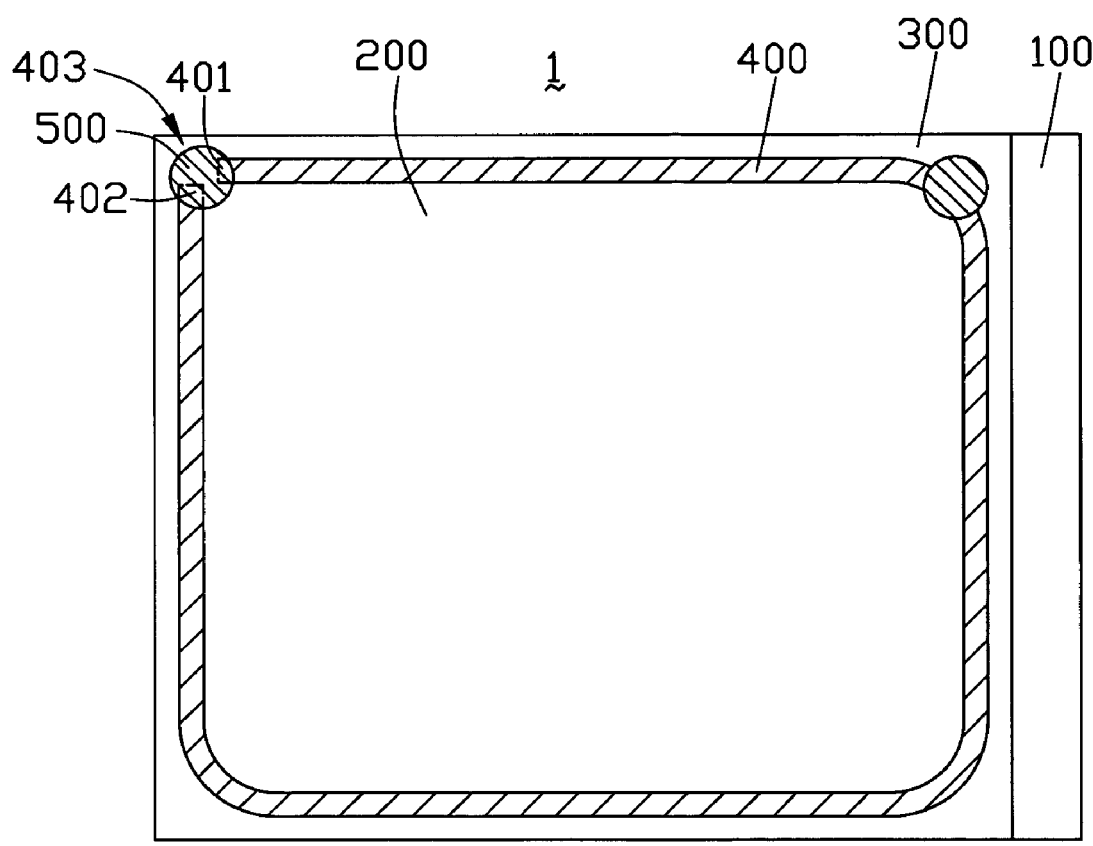
FIG. 1 is a cut-away, plan view of a liquid crystal display panel according to a first embodiment of the present invention.

Referring to FIG. 1, this shows a liquid crystal display panel according to a first embodiment of the present invention. The liquid crystal display panel 1 includes a lower plate 100, an upper plate 300 opposite to the lower plate 100, a liquid crystal layer 200 interposed between the lower plate 100 and the upper plate 300, and a plate sealing adhesive 400 applied to edge portions of an interface between the lower and upper plates 100, 200 and encircling the liquid crystal layer 200 therein. The plate sealing adhesive 400 bounds the liquid crystal layer 200. The plate sealing adhesive 400 has a first end 401 and a second opposite end 402. The first and second ends 401, 402 of the plate sealing adhesive 400 are spaced apart a distance, whereby an opening 403 is defined therebetween. An electrically conductive adhesive 500 is disposed at the opening 403, and interconnects the first and second ends 401, 402 of the plate sealing adhesive 400.

The plate sealing adhesive 400 may be an ultraviolet curing adhesive, for example an acrylic resin such as polymethyl methacrylate (PMMA). The plate sealing adhesive 400 may also be a heat curing adhesive or a mixture of an ultraviolet curing adhesive and a heat curing adhesive. The plate sealing adhesive 400 comprises a plurality of reinforcement members incorporated therein. The reinforcement members reinforce the plate sealing adhesive 400, so that a distance between the lower and upper plates 100, 200 is and maintained after the plate sealing adhesive 400 is cured. The reinforcement members typically comprise a plurality of glass fibers.

The electrically conductive adhesive 500 generally includes a silver cream, a conductive rubber, metal pieces, solder balls, and other materials if required. The metal pieces may be gold particles. The composition of the electrically conductive adhesive 500 may be the same as that of the plate sealing adhesive 400. The electrically conductive adhesive 500 may comprise an ultraviolet curing adhesive, for example an acrylic resin such as polymethyl methacrylate (PMMA). The electrically conductive adhesive 500 may also comprise a heat curing adhesive, or a mixture of an ultraviolet curing adhesive and a heat curing adhesive.

In the illustrated embodiment, the electrically conductive adhesive 500 is applied to the opening 403. The electrically conductive adhesive 500 interconnects the first end 401 and the second end 402. The plate sealing adhesive 400 of the liquid crystal display panel 1 can be evenly distributed. Any potential spreading of the plate sealing adhesive 400 of the liquid crystal display panel 1 is thus avoided. Consequently, compared with conventional liquid crystal display panels, the inventive liquid crystal display panel 1 has improved, more reliable sealing quality.

An exemplary method for manufacturing the liquid crystal display panel 1 comprises the following steps: providing the upper plate 300 and the lower plate 100; applying the plate sealing adhesive 400 to edge portions of the lower plate 100, with opposite ends of the plate sealing adhesive 400 spaced apart from each other to form an opening 403; applying the electrically conductive adhesive 500 to the lower plate 100, with at least a portion of the electrically conductive adhesive 500 being applied to the opening 403 to fill in the opening 403; attaching and adhering the upper plate 300 to the lower plate 100; and curing the plate sealing adhesive 400 and the electrically conductive adhesive 500.

In the illustrated embodiment, when the plate sealing adhesive 400 is applied to the lower plate 100, the application begins from a corner of the lower plate 100, continues along the edge portions of the lower plate 100, and ends at the same corner of the lower plate 100.

In the illustrated embodiment, at least a portion of the electrically conductive adhesive 500 is applied at the opening 403. The opening 403 may alternatively be provided at any other suitable position at a corner of or along one of the edge portions of the lower plate 100. The electrically conductive adhesive 500 may alternatively be arranged at two, three, or four corners of the lower plate 100. Further or alternatively, the electrically conductive adhesive 500 may be arranged at edges of the lower plate 100.

Once the electrically conductive adhesive 500 is applied, the lower and upper plates 100, 300 are then attached to each other to form a sealed panel. Liquid crystal material is then introduced into the sealed panel by the ODF method. At the same time, a plurality of spacers (not shown) is evenly arranged on the upper plate 300. By pressuring and adhering the upper plate 300 to the lower plate 100, the liquid crystal display panel 1 is obtained.

In addition, the method includes a step of curing the plate sealing adhesive 400, and a step of curing the electrically conductive adhesive 500. The two curing steps are very similar. If the plate sealing adhesive 400 is made of an ultraviolet curing resin, the step of curing the plate sealing adhesive 400 is performed using ultraviolet irradiation. If the plate sealing adhesive 400 is made of a heat curing resin, the step of curing the plate adhesive 400 is performed by heating the plate sealing adhesive 400.

Figure 2:
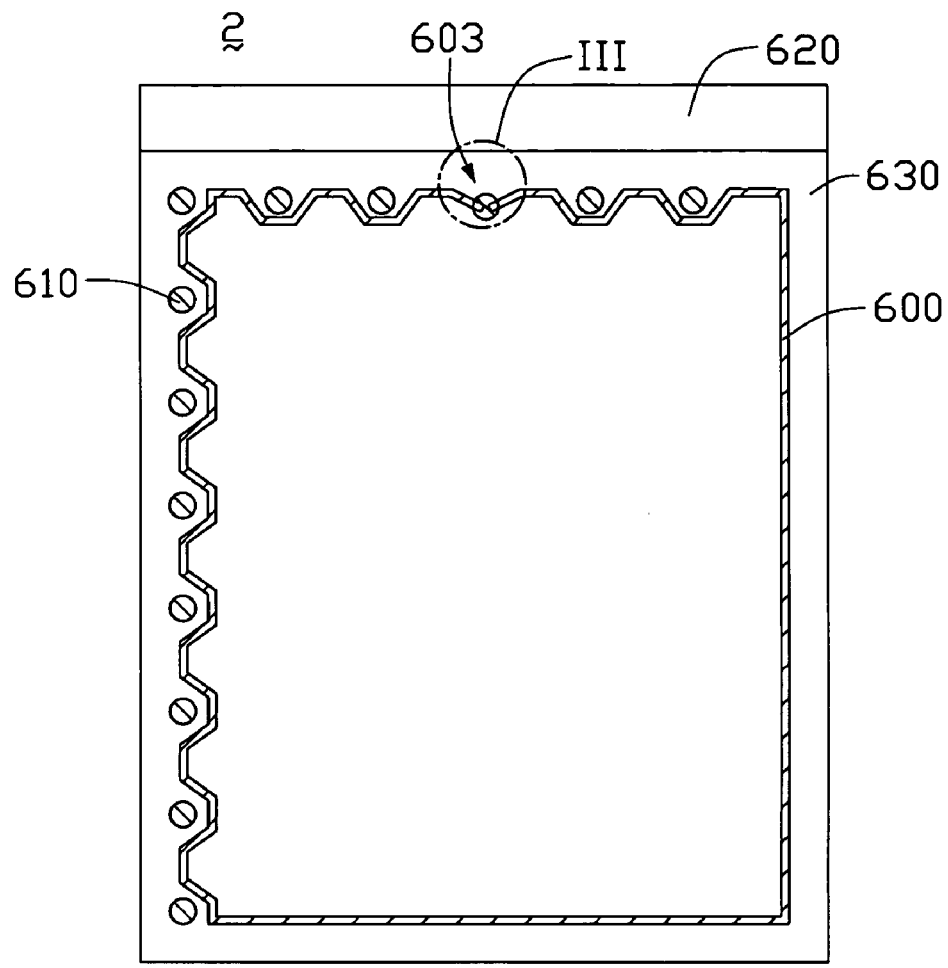
FIG. 2 is a cut-away, plan view of a liquid crystal display panel according to a second embodiment of the present invention.
Figure 3:
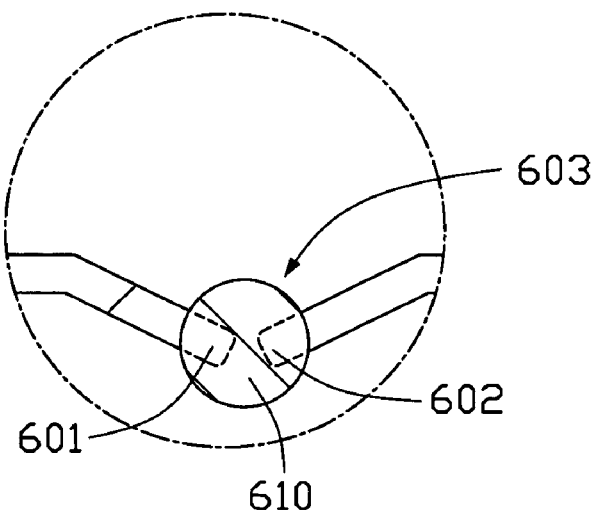
FIG. 3 is an enlarged view of a circled portion III of FIG. 2, showing a joint region of plate sealing adhesive.
Figure 4:
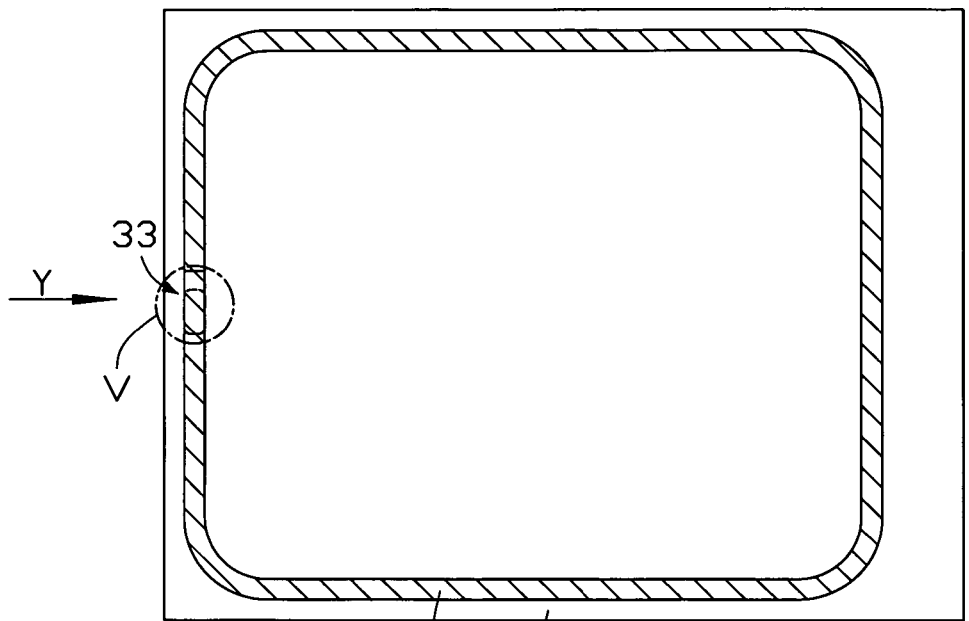
FIG. 4 is a cut-away, plan view of a conventional liquid crystal display panel.
Figure 5:
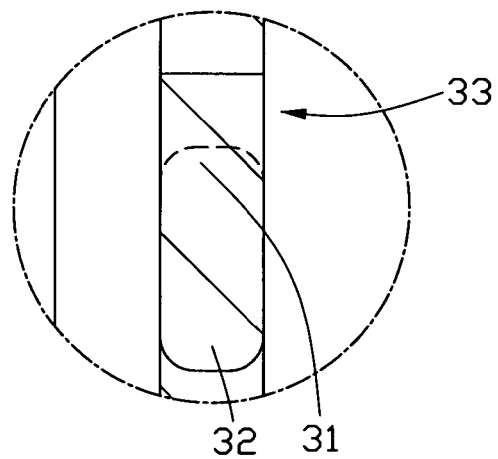
FIG. 5 is an enlarged view of a circled portion V of FIG. 4, showing a joint portion of plate sealing adhesive.
Figure 6:
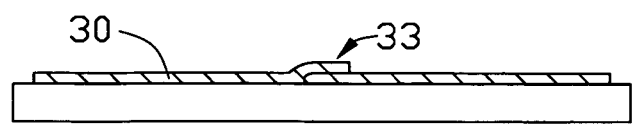
FIG. 6 is a left side view of the liquid crystal display panel shown in FIG. 4.
Figure 7:
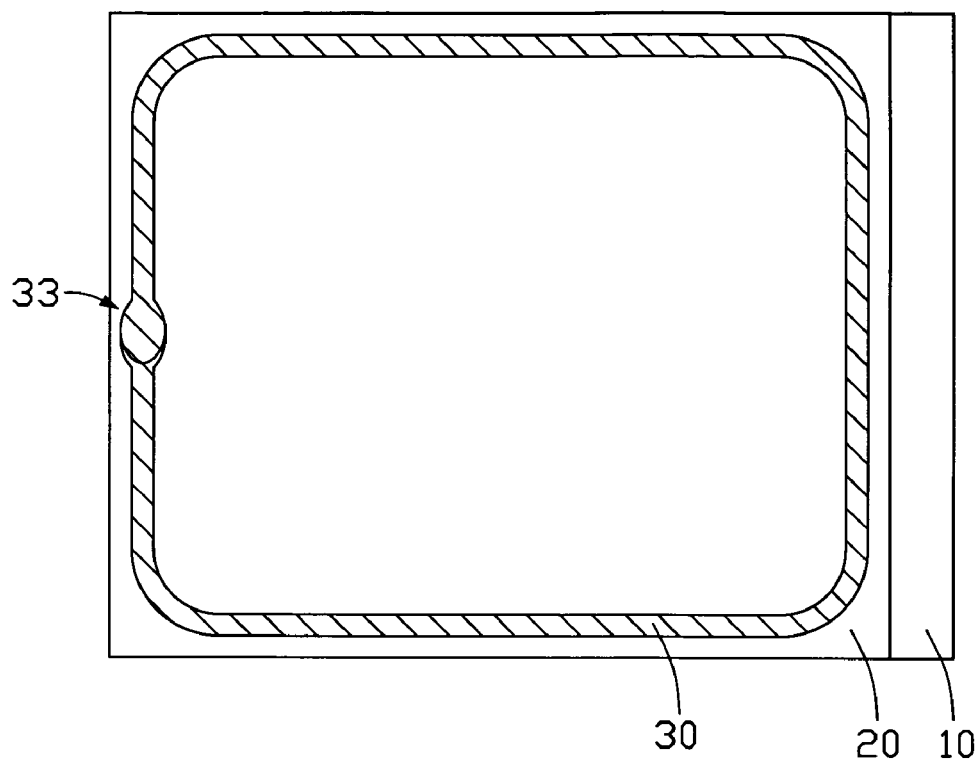
FIG. 7 is similar to FIG. 4, but showing a joint portion of a plate sealing adhesive of the liquid crystal display panel spread out because the plate sealing adhesive is pressed.
Figure 8:
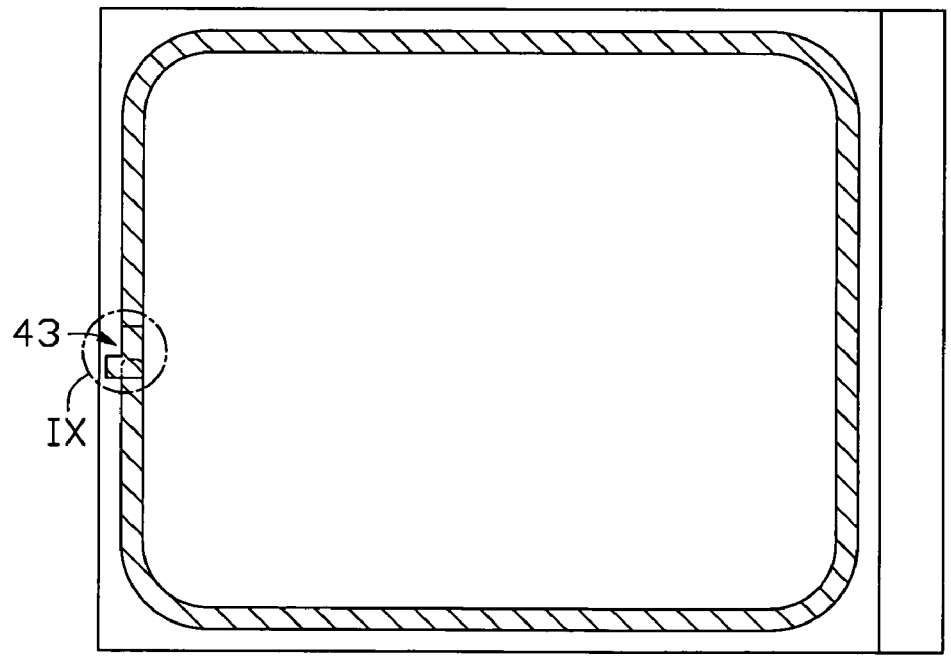
FIG. 8 is a cut-away, plan view of another conventional liquid crystal display panel.
Figure 9:
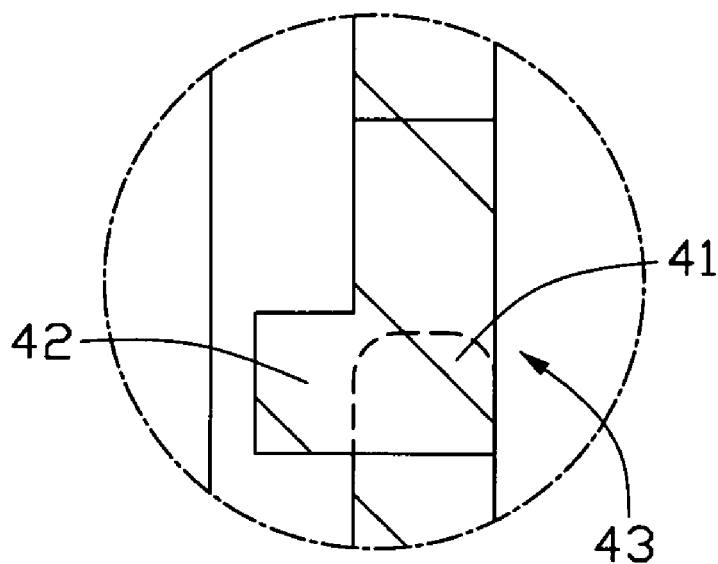
FIG. 9 is an enlarged view of a circled portion IX of FIG. 8, showing a joint portion of plate sealing adhesive.
Figure 10:
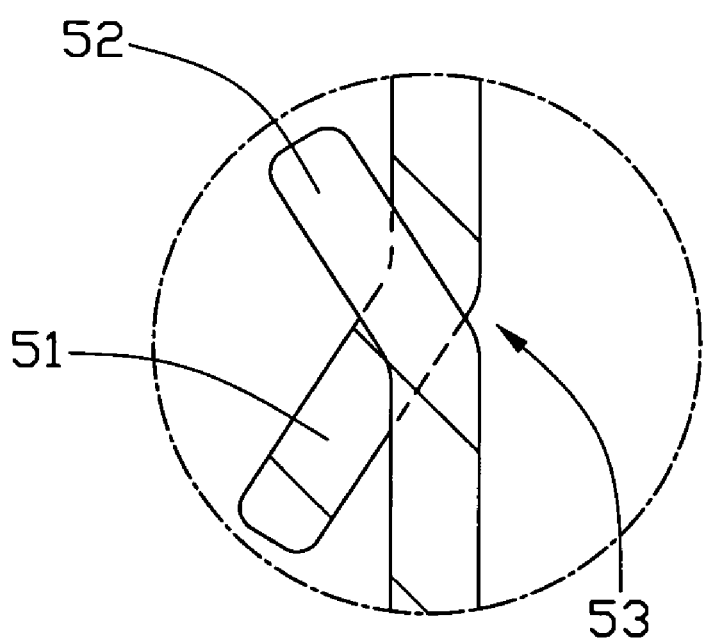
FIG. 10 is a similar to FIG. 9, but showing another conventional configuration of a joint portion of plate sealing adhesive.

FIGS. 2 and 3 show a liquid crystal display panel according to a second embodiment of the present invention. The liquid crystal display panel 2 includes a lower plate 620, an upper plate 630 opposite to the lower plate 620, a plate sealing adhesive 600 arranged between the lower and upper plates 100, 200, an electrically conductive adhesive 610, and an opening 603 defined between a first end 601 and an opposite second end 602 of the plate sealing adhesive 600. The plate sealing adhesive 600 is arranged along edge portions of the lower plate 620. At two edge portions of the lower plate 620, the plate sealing adhesive 600 runs in a generally zigzagged fashion, thereby defining a plurality of evenly spaced unoccupied areas. The electrically conductive adhesive 610 is applied to each of the unoccupied areas, and is also applied to the opening 603 in order to interconnect the first end 601 and the second end 602.

The electrically conductive adhesive 610 is applied to the opening 603, and interconnects the first end 601 and the second end 602, such that there is no a joint portion between the first end 601 and the second end 602, and the plate sealing adhesive can be evenly distributed. Consequently, compared with the conventional liquid crystal display panel, the present liquid crystal display panel 2 has a better sealing quality.

It is to be understood, however, that even though numerous characteristics and advantages of embodiments of the present invention have been set forth in the foregoing description, together with details of the structures and functions of the embodiments, the disclosure is illustrative only, and changes may be made in detail to the full extent indicated by the broad general meaning of the terms in which the appended claims are expressed.

What is claimed is:

1. A method for manufacturing a liquid crystal display panel, comprising:
   providing an upper plate and a lower plate;
   applying a plate sealing adhesive on the lower plate, the applied plate sealing adhesive defining an opening;
   applying an electrically conductive adhesive on the lower plate, with at least a portion of the electrically conductive adhesive being applied to the opening so as to fill the opening;
   introducing liquid crystal material into a space defined by the plate sealing adhesive and the electrically conductive adhesive by a one drop fill method;
   attaching the upper plate to the lower plate; and
   curing the plate sealing adhesive.

2. The method as recited in claim 1, wherein the plate sealing adhesive is arranged along edge portions of the lower plate.

3. The method as recited in claim 1, wherein the plate sealing adhesive is cured by an ultraviolet curing process.

4. The method as recited in claim 1, wherein the plate sealing adhesive is cured by a heat curing process.

* * * * *